(12) United States Patent
Aubert Solà-Morales et al.

(10) Patent No.: US 9,139,094 B2
(45) Date of Patent: Sep. 22, 2015

(54) TRANSMISSION CONTROL LEVER WITH USER INTERFACE

(75) Inventors: Jordi Aubert Solà-Morales, Barcelona (ES); Jordi Jornet Vidal, Terrassa (ES); David Tuset Danís, La Palma de Cervelló (ES)

(73) Assignee: FICO TRIAD, S.A., Mollet del Valles (Barcelona) (ES)

( * ) Notice: Subject to any disclaimer, the term of this patent is extended or adjusted under 35 U.S.C. 154(b) by 1399 days.

(21) Appl. No.: 12/441,348

(22) PCT Filed: Sep. 12, 2007

(86) PCT No.: PCT/EP2007/059604
§ 371 (c)(1),
(2), (4) Date: Mar. 13, 2009

(87) PCT Pub. No.: WO2008/031858
PCT Pub. Date: Mar. 20, 2008

(65) Prior Publication Data
US 2009/0312918 A1   Dec. 17, 2009

(30) Foreign Application Priority Data
Sep. 14, 2006   (EP) .................................... 06120686

(51) Int. Cl.
*G06F 19/00* (2011.01)
*B60K 37/06* (2006.01)
(Continued)

(52) U.S. Cl.
CPC ................. *B60K 37/06* (2013.01); *B60K 20/02* (2013.01); *B60K 35/00* (2013.01); *F16H 59/0217* (2013.01); *B60K 2350/1024* (2013.01); *B60K 2350/1028* (2013.01)

(58) Field of Classification Search
CPC ............. G05G 9/47; G05G 9/06; G05G 9/10; G05G 2009/0474; G05G 2009/04744; G05G 2009/04751; G05G 9/04788; G05G 21/00; F16H 59/0217; F16H 2059/0221; Y10T 74/20073; Y10T 74/20159; Y10T 74/20165
USPC ....................................... 701/48, 51; 9/48, 51
See application file for complete search history.

(56) References Cited

U.S. PATENT DOCUMENTS 4,912,997 A * 4/1990 Malcolm et al. ................. 74/335
6,505,139 B1 * 1/2003 Koga et al. ..................... 702/148
(Continued)

FOREIGN PATENT DOCUMENTS

DE   19919457 A1   11/2000
DE   10013054 A1    9/2001
(Continued)

OTHER PUBLICATIONS

Notification of Transmittal of the International Search Report and the Written Opinion of the International Searching Authority, or the Declaration, Feb. 1, 2008, European Patent Office.
(Continued)

*Primary Examiner* — John Q Nguyen
*Assistant Examiner* — Kyung Kim
(74) *Attorney, Agent, or Firm* — Peter B. Scull; Hamilton, DeSanctis & Cha LLP

(57) ABSTRACT

It comprises an operating device (gearshift command) for at least browsing and selecting one or more functions, and output device (e.g. a display) for sending information to an user about at least the selected function. Gearshift command is suitable for further setting a corresponding status of said function (on/off status, adjustable status). Functions comprise at least a function related to driving and other functions (comfort, multimedia, etc). The operating device may be provided with locking device for enabling or disabling operation of functions.

13 Claims, 3 Drawing Sheets

(51) Int. Cl.
*B60K 20/02* (2006.01)
*B60K 35/00* (2006.01)
*F16H 59/02* (2006.01)

(56) References Cited

U.S. PATENT DOCUMENTS

| | | | |
|---|---|---|---|
| 6,756,967 B2 * | 6/2004 | Onodera et al. | 345/161 |
| 6,851,538 B2 * | 2/2005 | Meyer et al. | 192/219.4 |
| 2002/0162699 A1 | 11/2002 | Shiomi et al. | |

FOREIGN PATENT DOCUMENTS

| | | |
|---|---|---|
| DE | 10207872 A1 | 9/2003 |
| DE | 10348221 A1 | 5/2005 |
| EP | 0875698 A1 | 11/1998 |
| JP | H10274541 A | 10/1998 |
| JP | 2001-105926 | 4/2001 |
| JP | 2001243853 A | 9/2001 |
| JP | 2002-254942 | 9/2002 |
| WO | WO2004089677 A2 | 10/2004 |

OTHER PUBLICATIONS

Japanese Patent Office, Notice of Rejection, Patent Application No. 2009-527823 (corresponding Japanese application to current application No. 12441348) dated Sep. 4, 2012, Tokyo, Japan.

* cited by examiner

TRANSMISSION CONTROL LEVER WITH USER INTERFACE

FIELD OF THE INVENTION

The present invention relates to a driving assistant for controlling and/or adjusting functions related to driving, such as for example changing gear, driving mode, suspensions adjustment, etc. This is carried out by an operating device that allows the user at least browsing and selecting one or more functions. An output device is also provided such as for example a display for displaying information about at least the selected function.

BACKGROUND ART

Known solutions for controlling several functions in a motor vehicle are for example the one disclosed in DE10207872 which refers to a device for selecting information from a menu structure and controlling a screen display. It comprises a joystick lever that pivots about its longitudinal axis for menu selection highlighting the field on the display. The joystick has a rotating and clicking top button and it has a start position and it can be moved with two degrees of freedom relative to this point. An additional movement of the activation member enables the menu to be reset to its highest menu layer.

Further prior art solutions provides the use of other structures for controlling functions (typically multimedia functions) on a motor vehicle such as buttons, rotating, jog wheels, etc. These structures, including the joystick lever, involve the provision of a multiplicity of items scattered inside the vehicle around the driving position (steering wheel, cockpit, central instrument board, etc.) so that they can be reached by the driver.

This has the disadvantage that the more functions to be controlled the more control devices (buttons, switches, levers, etc.) would have to be provided for that control. Dedicated control devices further increases the system total cost.

SUMMARY OF THE INVENTION

An object of the present invention is to provide a driving assistant for controlling functions, for example functions related to driving, or other functions, in a motor vehicle, in such a way that controlling of said functions by the user is easy. Such control through the driving assistant of the invention can be carried out during driving or at any other given time. For example, the user can control functions such as for example a driving mode (4×4, etc) while driving but the user can also control functions such as for example mirror adjustment before driving.

The term "functions related to driving" as used herein refers to those functions associated with a motor vehicle that affect its behaviour, such as for example changing gear, either in automatic (park, reverse, neutral, drive) or manual or sequential mode. Other examples of driving related functions according to the present invention are driving modes (sport, city, etc.), suspension adjustments (stiffness, height), etc.

As stated above, the driving assistant of the invention can control functions other than driving related functions. Said other functions may for example comprise at least a comfort function (air conditioner, etc) or at least a multimedia function (radio, CD, display).

Functions may be put into groups as follows:
direct vehicle dynamic control:
    shifter (ATX, sequential)
    (adaptive) cruise control
    retention/parking assistant
    lane keeping assistant
    parallel parking assistant
    throttle and brake control
operational modes:
    traction mode
    4×4
    ESP
    pre-crash brake assist
    engine mode for hybrid vehicles (electric, gasoline, auto, etc
regulations:
    suspension regulation (stiffness, height),
    mirror adjustment
    seat adjustment
    steering wheel position adjustment
special functions:
    engine start/stop.

While driving assistant of the invention is particularly addressed to control functions related to driving, it is not intended to be limited to these functions but it may be used for controlling another type of functions, such as for example for controlling multimedia devices or a vehicle air conditioner system.

The driving assistant of the invention may comprise an operating device for at least browsing and selecting one or more functions.

In one embodiment, this gearshift command may be suitable for further setting a corresponding status of said function.

Therefore, the user can browse a menu for selecting a function. The function can be merely left selected or, in addition, the status of the selected function can be set. In some cases, the status can be set only by selecting that function, i.e. simply by focusing the target function. When a function status has been set and the current function is left for jumping to another function in the menu, that function status remains unchanged save as otherwise changed by the user.

For example, an user browsing the menu through the gearshift command selects a driving mode from Winter/Sport/City by focussing one option e.g. in a vertical menu. The user can change the status of the function selected (enabling or disabling said function). Once the function has been focussed by using the gearshift command, the status of said function can be set either by using the same gearshift command or using another separate command (for example a switch, joystick or other suitable command). As stated above, in some cases the function status is set when the function is focussed in the menu by the command. When passing to another function in the menu, e.g. in a horizontal menu, the last function status selected remains unchanged while it is not set again by the user.

The status of the selected function may be an on/off status and/or an adjustable status. Examples of on/off status of a function is ESP (Electronic Stability Program), driving modes (sport, city, winter). Examples of adjustable status of a function is suspension adjustment, etc. in which user can adjust parameters all along an allowed range. In both cases, the selection would not require a confirmation action. As compared to other devices such as a computer mouse in which the user first selects the position and then clicks to confirm the selected option, with the operating device of the invention the option is selected with up, down, left, right movements thereof (optionally in conjunction with locking device as explained hereinbelow and the option becomes active.

According to the invention, the operating device may be the gearshift command (usually the gearshift lever) of the motor vehicle, so that with the same gearshift lever, at least a function related to driving may be controlled, including the gear change.

There may be also provided output device for giving feedback to the user. This feedback may be visual (display), audible (sound), vibration, haptic, or other. In the case the output device is for example a display, it sends information through a menu about at least a function that the user has been selected by the gearshift lever. The menu in the display shows different functions the user is allowed to enable, disable and/or adjust. The display may comprise a dedicated display or an existing vehicle display. In any case, the display may be for example a touch screen or a head-up display. Additional information could be provided to the user related to the selected function to enrich the user with augmented reality, camera visualization, proximity sensors, or any other related functions.

In some embodiments, the gearshift lever may be a shift by wire type gearshift lever and it may be in the form of a joystick. In these embodiments, the operating device may comprise a number of sensors associated to a logic control communicating with elements of the motor vehicle which respond upon operation of the gearshift lever. These sensors deals either with signals related to driving or any other type of signals.

According to a further embodiment of the invention, the lever may be displaceable from one single stable position (when not operated) to at least one unstable position, typically four: up, down, right, left, for said control operations. The lever automatically returns to its stable position as it is released.

Still in some embodiments, the operating device may be provided with locking device for enabling or disabling operation of functions. This locking device may be in the form of a push button fitted on the gearshift lever knob. Locking device may alternatively enable or disable functions by software. In this way, functions may be controlled according to different criteria, such as for example depending upon vehicle conditions (speed, open/closed door status, etc.)

It is to be noted that the main function of the driving assistant of the invention remains the gear change (whether the user is browsing within the options menu or not). When controlling driving functions on the display, a movement of the joystick lever (optionally in conjunction with the locking device) to one direction would cause the operation mode returns back to the automatic gear change mode. Likewise, a movement of the joystick lever to another direction (optionally in conjunction with the locking device), for example an opposite direction, would cause the operation mode return back to function control. A reset function would permit any previously selected option to be deleted thus simplifying the task of returning to a normal driving mode.

On the other hand, for ensuring an easy driver function checking, all function real-time status might be highlighted in menu display margins.

The driving assistant communicates bidirectionally with the motor vehicle for sending some commands to a receiving system (operating reverse gear, activating ASR, etc . . .), as well as receiving information about the state of the vehicle (speed, brake pedal) which will be used for enabling or disabling some of the functions as appropriate according to safety or reliability criteria.

BRIEF DESCRIPTION OF THE DRAWINGS

A particular embodiment of a driving assistant according to the present invention will be described in the following, only by way of non-limiting example, with reference to the appended drawings, in which.

DETAILED DESCRIPTION OF PARTICULAR EMBODIMENTS

The driving assistant of the invention comprises an operating device such as a gearshift lever 100 of a motor vehicle. The gearshift lever 100 may be for example a shift by wire type gearshift lever.

Figure 4:
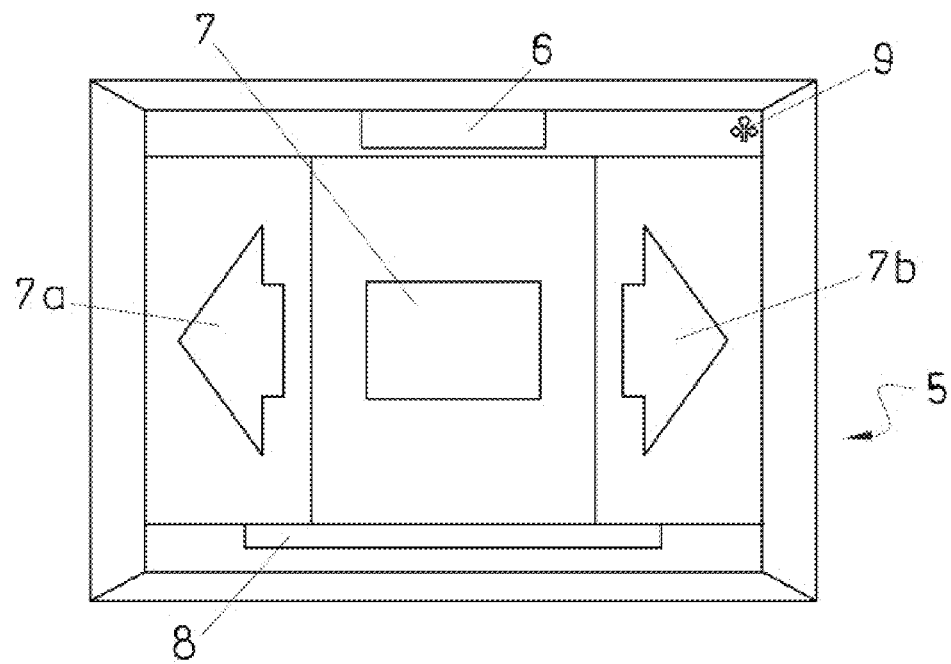
FIG. 4 is a diagrammatic view of a display device in which several sections may be seen.
Figure 5:
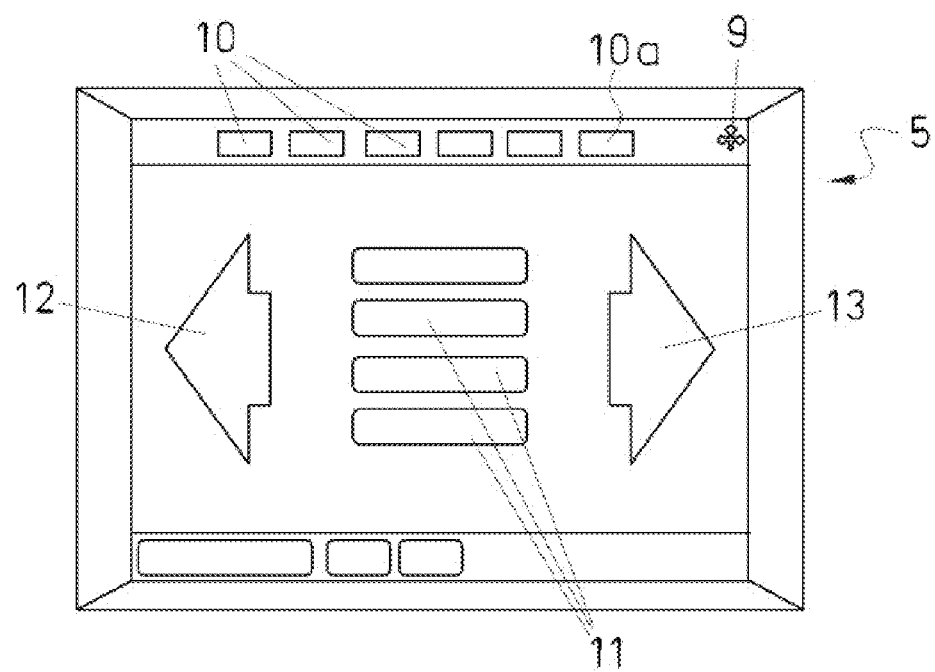
FIG. 5 is a diagrammatic view showing one exemplary embodiment of a display menu in one given status.

Lever 100 permits the user at least browsing and selecting one or several of functions. A corresponding status of said function can be also set. At least one of such functions is a function related to driving. The driving assistant of the invention further includes output device for giving feedback to the user. In the embodiment, the output device is a display such a touch screen displaying information about at least the selected function as shown in FIGS. 4 and 5 of the drawings.

Lever 100 may be provided with locking device 110 for enabling or disabling operation of functions.

The status of a function that is to be selected by the lever 100 may be an on/off status or an adjustable status. Such functions may be selected from the group consisting of direct vehicle dynamic control [shifter —atx, sequential—, (adaptive) cruise control, retention/parking assistant, lane keeping assistant, parallel parking assistant], operational modes [traction mode, 4×4, ESP, pre-crash brake assist], and regulations [suspension regulation —stiffness, height—, mirror adjustment, seat adjustment, steering wheel position adjustment].

Figure 3:
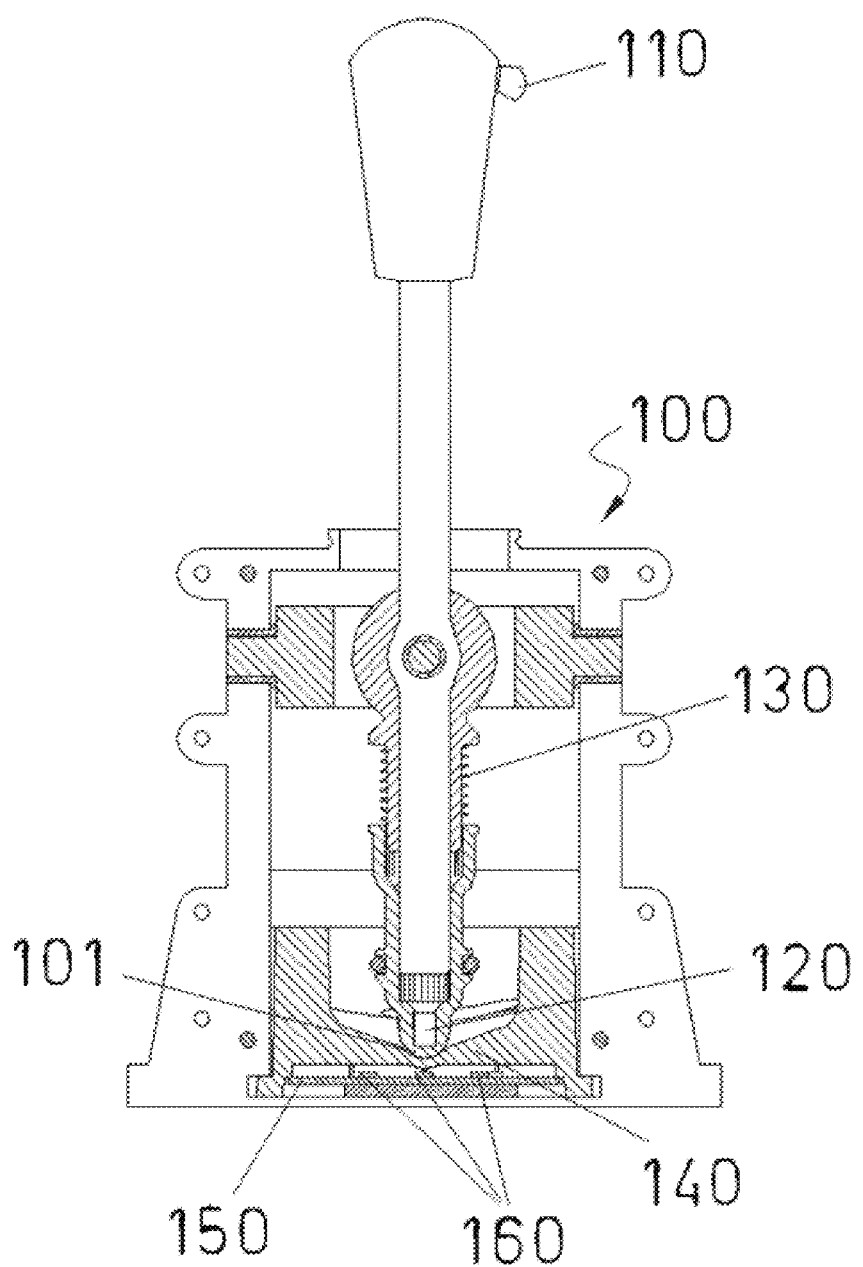
FIG. 3 is a perspective view of the operating device of a driving assistant according to the invention.

Referring now to FIG. 3, the operating device (selector lever 100) comprises a lower follower finger 120 which may be displaced axially relative to the lever 100 and a compression spring 130 arranged outside and around the lever 100 such that the follower finger 120 is urged downwardly against a contoured surface 140 arranged at the bottom of the device in such a way that the selector lever tip 101 is always substantially in contact with said contoured surface 140.

The operating device further includes an emitting and receiving device for detecting the position of the selector lever tip 101 on the contoured surface 140. The receiving device comprises an electronic board 150 fitted below the contoured surface 140, at the bottom thereof. The electronic board 150 is provided with a series of sensors 160 arranged at the bottom thereof and associated to a logic control which communicates with elements of the motor vehicle (suspensions, transmission, etc) which respond upon operation of the gearshift lever 100.

In order the user operates the lever 100, the lever 100 is displaceable from one stable position, which is normally a central position, i.e. with the lever 100 in a upright position, to at least one unstable position. The term "unstable" as used herein means a position reached when the user moves the lever 100 from that central, stable position, and when the lever 100 is then released, it returns back to said stable position.

Figure 1:
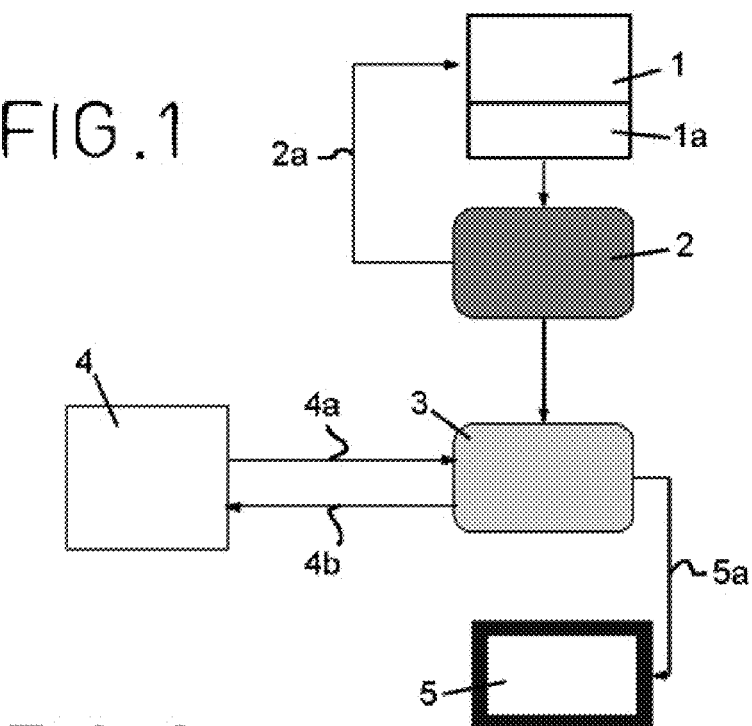
FIG. 1 is a block diagram showing the operation of the driving assistant of the invention.

In FIG. 1 the operation of the driving assistant of the invention in which user selection 1, by moving 2 a command 100 through an action 1a, is shown. Command may comprise the shift by wire gearshift joystick lever assembly 100 shown in FIG. 3 having sensors 160 outputting an electric signal to a logic 3. The lever assembly 100 may have static feedback 2a (feeling) or dynamic, controlled through a force-feedback actuator which dynamically varies the force.

Logic 3 implements the machine main state, or logic of the system. It takes as a main input the position 2 of the joystick lever 100 (and enable button 110), and also some critical information from the vehicle 4a such as vehicle speed or brake pedal pressed. It computes the command to be sent to electronic control units 4 (ECUs) for executing a request 4b (move to drive position, disable ESP, etc).

A display device 5 shows the current status and the information 5a of the possible functions to be done by the driver. Audio messages could also be used as an additional feedback to the driver.

Figure 2:
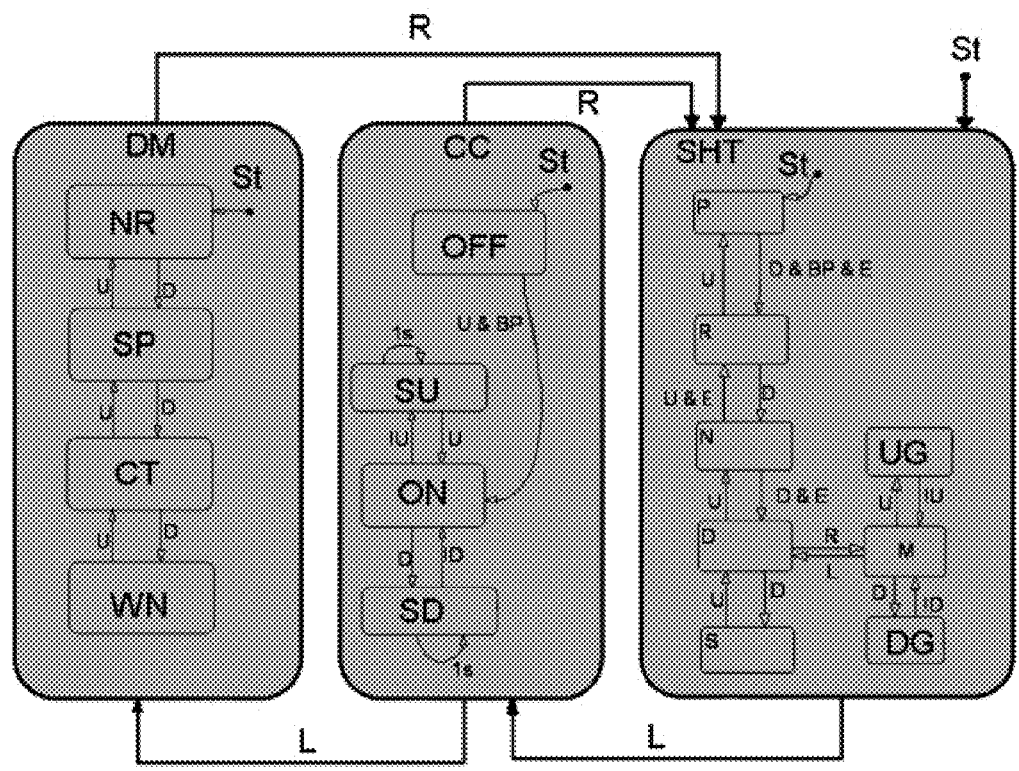
FIG. 2 is a block diagram showing one example of machine state implementing three functions.

One example of machine state implementing three functions is shown in FIG. 2. Functions in this example are:
  driving (traction) mode DM that may be normal NR, sport SP, city CT or winter WN; the status of those functions can be adjusted;
  cruise control CC in which speed may be increased (SU) or decreased (SD); the status of those functions can be enabled (ON) or disabled (OFF); and
  shifting SHT (automatic and sequential) in which gear may be set to the known modes park, reverse, neutral, drive, sport (P-R-N-D-S)

In this example, the driving assistant is initially in a shifter function mode SHT. A left tip L or right tip R of the lever will change the function. In one example, a left tip L of the lever will sequentially enable one function after another. A single right tip R of the lever will return to the shifter mode SHT again, regardless of the mode or function. This increases the availability of the most critical function, the shifter, making the system safer. An up tip U of the lever or a down tip D of the lever will enable different options within a function.

Modes, such as drive modes DM, are usually permanent. In some particular cases, modes are mono-stable, that is, they are active only when a lever tip is performed, returning back to a previous position. This is for example the case of the up gear or the speed decrease.

For safety-critical modes, additional requirements will be needed to change the mode. For example, for changing from park P to reverse R a pressed brake pedal signal must be read, and the user have to press an enable button. Otherwise, the lever tip will have no effect.

The user (driver) can go from down position D (optionally also from S position) to manual mode M with a right tip R. This have a result equivalent to putting sequential gearshift to M, activating the sequential mode in the gearshift, where the gearbox will not select an automatic gear. Instead of that, an up tip U will increase gear up to the maximum available gears, and a down tip will D decrease it down to the first gear.

Some other modes (such as for example increase/decrease speed modes SU/SD) use time to change repeatedly. Speed is increased in a fixed amount either when doing a tip lever, or once per second when keeping it pressed.

Menu in the display 5 as shown in FIGS. 4 and 5 can be browsed by the user for selecting a function using the gearshift command 100. Once the desired function has been selected by being focussed on the menu by the command 100, its status (on/off/adjust) may be in some cases automatically set. In other cases, the status of the selected function is set either by acting on the gearshift lever 100 or using another separate command (for example a switch, joystick or other suitable command). Once the function status has been set and the current function is then left for jumping to another function in the menu, that function status remains unchanged save as otherwise changed by the user.

The example of the display device 5 diagrammatically shown in FIG. 4 displays the user a menu list 6 and menu options 7. Menu options 7 can be scrolled either to left 7a and right 7b in the display menu. The status of the selected function is displayed on a display box 8, for example, ESP, driving mode, current gear, etc. Display device 5 may show other additional information, a logo 9, etc.

One example a of said status is diagrammatic shown in FIG. 5. The display has an attractive appearance which may be configured as desired. In the example shown, the upper portion of the display menu shows different available functions 10 (e.g. ESP, the user and the selected function 10a, for example suspensions, driving mode, etc) and the currently selected function 10a. Information about available function status is shown in several boxes 11. Previous and next function status, 12, 13 are also displayed in the menu.

The state of any function may be logged. There would be an initial status as a default state (e.g. cruise control/off), but if default state is changed, whenever the user quit and go back from that function, last state will be restored (e.g. a city mode is active and the user goes back to the shifter mode and then again to drive modes; the state within drive modes is still city mode.

In some particular functions this will be different, as in the case of cruise control CC in which initial state is off, and it can be enabled by the driver, but it will be disabled any time the driver changes the function. Also, in this mode, cruise control CC will be automatically disabled if an action in the brake pedal of the vehicle, or other driver actions, is carried out, as in most cars having this function.

User may drive lever up U, down D, left L, right R. The display 5 show the user information about whether the enable button E is pressed, or the brake pedal BP is pressed, the vehicle Speed SP.

Function list may be, for example, circular to the left, i.e., a left tip L in the last function (driving modes DM) will go to the second function (cruise control CC). There is no need for going to the first function (shifter SHT) because this is always available in one right tip R.

Function order is a critical parameter. In particular, given a set of functions to be implemented, it should be established an order that will be set according to a number of rules:
  a function that is more frequently used will be prior to one that is rarely used. In the example, the cruise control CC is a function used more often than driving modes DM, so it is put before. This rule is coherent in the sense that the first function, shifter SHT, is the one that is always used;
  preference is given to a certain functions over others; for example preference may be given to a function related to direct vehicle dynamic control over operational modes function, and in turn preference is given to this one over adjustments; this has to be considered as an exemplary criterion and as a rule of thumb the most critical functions would have the higher preference in the sense of having them promptly available while driving.
  semantic proximity, where two functions having similarities shall be closer to one another than two being completely different (e.g. suspension stiffness and suspension height should be close to one another).

Proper combination of this (and other) rules will have a big impact on the usability of the device.

Modifications considered as convenient may be introduced in the driving assistant described herein provided that the essence of the invention that is summarized in the following claims is not altered.

The invention claimed is:

1. A driving assistant, comprising:
an operating device including a menu for at least browsing and selecting and operating one or more functions, and
an output device for sending information to a user about a selected function of the one or more functions, wherein the output device comprises at least one display, the display providing for displaying the menu for at least browsing, selecting and operating one or more functions, and,
said operating device further comprising the gearshift command of a motor vehicle, the one or more functions being disposed to function upon selected operation of the gearshift command, the selected operation of the gearshift command being directly related to and interactive with the menu provided on the display of the output device for browsing, selecting and operating one or more functions, and
wherein said gearshift command is displaceable from one stable position to at least one unstable position; and,
wherein the one or more functions include both driving related and non-driving related functions and include one or more direct vehicle dynamic control functions and one or more operational modes, and one or both of comfort functions and multimedia functions, and
wherein the direct vehicle dynamic control functions are one or more of a shifter (SHT) - automatic (ATX), sequential-, (adaptive) cruise control (CC), a retention/parking assistant, a lane keeping assistant, and a parallel parking assistant; and
wherein the operational modes are one or more of a traction mode, 4×4, Electronic Stability Program (ESP), and pre-crash brake assist,
wherein said gearshift command is a shift by wire type gearshift lever.

2. A driving assistant as claimed in claim 1, wherein said gearshift command is configured to set a corresponding status of said selected function.

3. A driving assistant as claimed in claim 1, wherein said operating device comprises a number of sensors associated with a logic control which communicates with elements of the motor vehicle which respond upon operation of the gearshift command.

4. A driving assistant as claimed in claim 1, wherein said gearshift command is displaceable from one stable position to three or more unstable positions.

5. A driving assistant as claimed in claim 1, wherein said functions comprise a function related to driving.

6. A driving assistant as claimed in claim 1, wherein said functions comprise a comfort function.

7. A driving assistant as claimed in claim 1, wherein said functions comprise a multimedia function.

8. A driving assistant as claimed in claim 2, wherein the status of said selected function is an on/off status.

9. A driving assistant as claimed in claim 2, wherein the status of said selected function is an adjustable status.

10. A driving assistant as claimed in claim 1, wherein the operating device is provided with a locking device for enabling or disabling operation of functions.

11. A driving assistant as claimed in claim 1, wherein said output device is one or more of a display, which is one or more of standard visual display, touch screen or head-up display; and includes one or more of an audible, vibration, or haptic output device.

12. A driving assistant as claimed in claim 1, wherein said functions are driving-related and further include one or more regulations.

13. A driving assistant as claimed in claim 12, wherein the regulations are one or more of suspension regulation stiffness, height, minor adjustment, seat adjustment, and steering wheel position adjustment.

* * * * *